United States Patent [19]

Nakajima et al.

[11] Patent Number: 5,443,664
[45] Date of Patent: Aug. 22, 1995

[54] SURGE CURRENT-SUPPRESSING CIRCUIT AND MAGNETIC DEVICE THEREIN

[75] Inventors: Shin Nakajima; Noriyoshi Hirao; Kiyotaka Yamauchi; Osamu Shimoe, all of Kumagaya, Japan

[73] Assignee: Hitachi Metals, Ltd., Tokyo, Japan

[21] Appl. No.: 433,287

[22] Filed: Nov. 8, 1989

[30] Foreign Application Priority Data

Nov. 16, 1988 [JP] Japan .................. 63-289617
Apr. 4, 1989 [JP] Japan .................... 1-84964

[51] Int. Cl.$^6$ ............................................. H01F 1/047
[52] U.S. Cl. .................................. 148/307; 148/310; 420/89; 361/118
[58] Field of Search .................. 148/307, 310, 311; 420/89, 117; 361/118

[56] References Cited

U.S. PATENT DOCUMENTS

| | | | |
|---|---|---|---|
| 3,856,513 | 12/1974 | Chen et al. | 148/403 |
| 4,358,808 | 11/1982 | Praeg | 361/11 |
| 4,608,297 | 8/1986 | Shimada et al. | 428/215 |
| 4,637,843 | 1/1987 | Takayama et al. | 420/117 |
| 4,871,925 | 10/1989 | Yamauchi et al. | 307/415 |
| 4,881,989 | 11/1989 | Yoshizawa et al. | 148/307 |
| 5,069,731 | 12/1991 | Yoshizawa et al. | 420/89 |

FOREIGN PATENT DOCUMENTS

| | | |
|---|---|---|
| 0214305A1 | 2/1986 | European Pat. Off. . |
| 0204361A1 | 5/1986 | European Pat. Off. . |
| 0271657 | 6/1988 | European Pat. Off. . |
| 0299498A1 | 7/1988 | European Pat. Off. . |
| 55-19976 | 5/1980 | Japan . |
| 2138215 | 4/1984 | United Kingdom . |
| 2139008 | 4/1984 | United Kingdom . |

OTHER PUBLICATIONS

JIS Handbook, Electronics, "Test Methods of Coil and Transformer Magnetic Cores C2562", published by the Japan Standard Association, 1981.

Watanabe et al., "Composition of the Power Supply System of JT-60 Active Beam Source and Suppression of Surge Current", The Japan Atomic Energy Research Institute, JAERI-M 86-104, Jul. 1986.

*Primary Examiner*—George Wyszomierski
*Attorney, Agent, or Firm*—Finnegan, Henderson, Farabow, Garrett & Dunner

[57] ABSTRACT

A surge current-suppressing circuit for an accelerator comprising a magnetic device inserted between a high-voltage DC power supply and an ion source for suppressing surge current generated when electric charge stored in a stray capacitance existing between the high-voltage DC power supply and the load is released at the time of short-circuiting of the load. The magnetic device comprises a magnetic core constituted by interlaminar-insulated thin ribbons of an iron-base amorphous or fine crystalline soft magnetic alloy. The iron-base fine crystalline soft magnetic alloy has the composition represented by the general formula:

$$(Fe_{1-a}M_a)_{100-x-y-z-\alpha}Cu_xSi_yB_zM'_\alpha$$

wherein M is Co and/or Ni, M' is at least one element selected from the group consisting of Nb, W, Ta, Zr, Hf, Ti and Mo, and a, x, y, z and α respectively satisfy $0 \leq a \leq 0.5$, $0.1 \leq x \leq 3$, $0 \leq y \leq 30$, $0 \leq z \leq 25$, $5 \leq y+z \leq 30$ and $0.1 \leq \alpha \leq 30$, at least 50% of the alloy structure being fine crystal grains made of a bcc Fe solid solution having an average crystal grain size of 1000Å or less when determined from a maximum size of each crystal grain.

10 Claims, 3 Drawing Sheets

SURGE CURRENT-SUPPRESSING CIRCUIT AND MAGNETIC DEVICE THEREIN

BACKGROUND OF THE INVENTION

The present invention relates to a magnetic device for suppressing surge current generated by a stray capacitance between a high-voltage DC power supply and a load (ion source) at the time of discharge breakdown of the ion source in a neutral beam injector for a nuclear fusion reactor, etc. and to a surge current-suppressing circuit comprising such a magnetic device.

A neutral beam injector comprises an accelerator for accelerating ions in a plasma gas, neutralizing them and injecting them into another plasma, etc. In this neutral beam injector, the accelerator should have a function to suppress current flowing as a surge from a high-voltage DC power supply side to an ion source at the time of discharge breakdown of the ion source which is a load in this apparatus, thereby preventing the ion source from being destroyed and also preventing continuous discharge breakdown.

Figure 1:
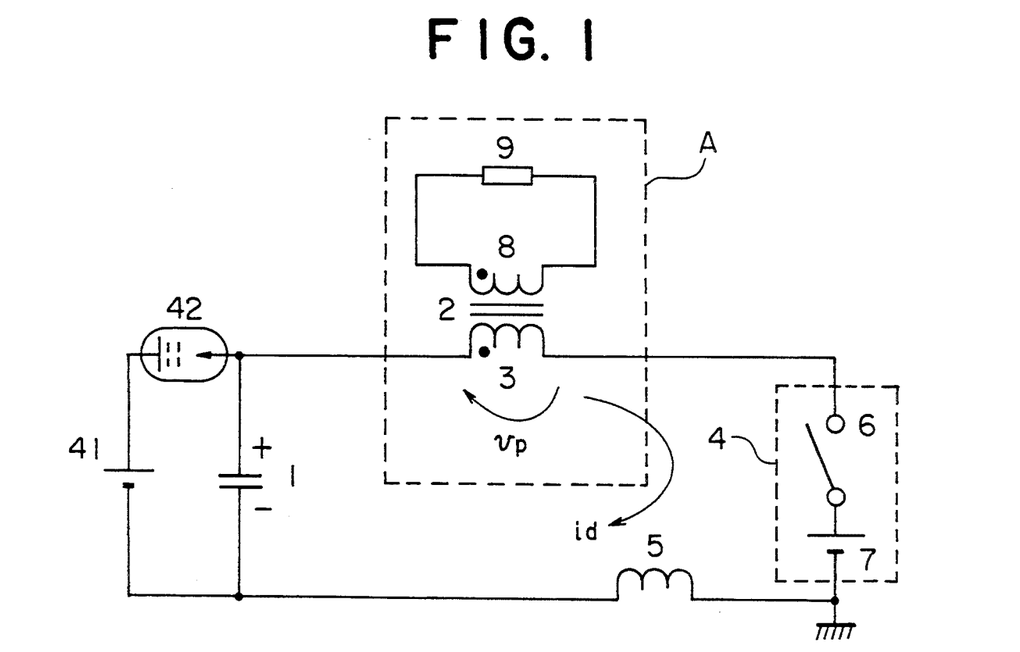
FIG. 1 is a schematic view showing a surge current-suppressing circuit including no bias circuit.

Specifically, the accelerator is constituted by a circuit as shown in FIG. 1. When discharge breakdown is caused in the ion source 4, a high-output tetrode 42 (hereinafter referred to as "regulator tube") provided between an unstable high-voltage DC power supply 41 and an ion source 4 for conducting regulation is cut off in about 20 μs or less, thereby preventing energy from flowing from the high-voltage DC power supply 41 to the ion source 4. In addition, to absorb energy stored in a stray capacitance 1 hypothetically existing on the load side from the regulator tube 42, a surge current-suppressing circuit, which is called "surge blocker, shown by the block "A" in the figure is provided. The surge blocker "A" comprises a magnetic core 2 constituted by toroidal ferrite, etc., a primary winding 3, and a secondary winding 8 provided with a resistor 9 for suppressing the ringing of discharge current $i_d$ supplied from the stray capacitance 1 at the time of short-circuiting of the ion source 4 and for consuming the energy of the discharge current $i_d$.

Incidentally, in FIG. 1, 5 denotes a wire inductance (stray inductance generated by wiring, and 6 denotes a switch depicted as a model for showing a short-circuiting phenomenon of the ion source 4. When the switch 6 is turned on, the ion source 4 is short-circuited. 7 denotes a voltage source for showing voltage decrease at the time of short-circuiting of the ion source 4.

Figure 2:
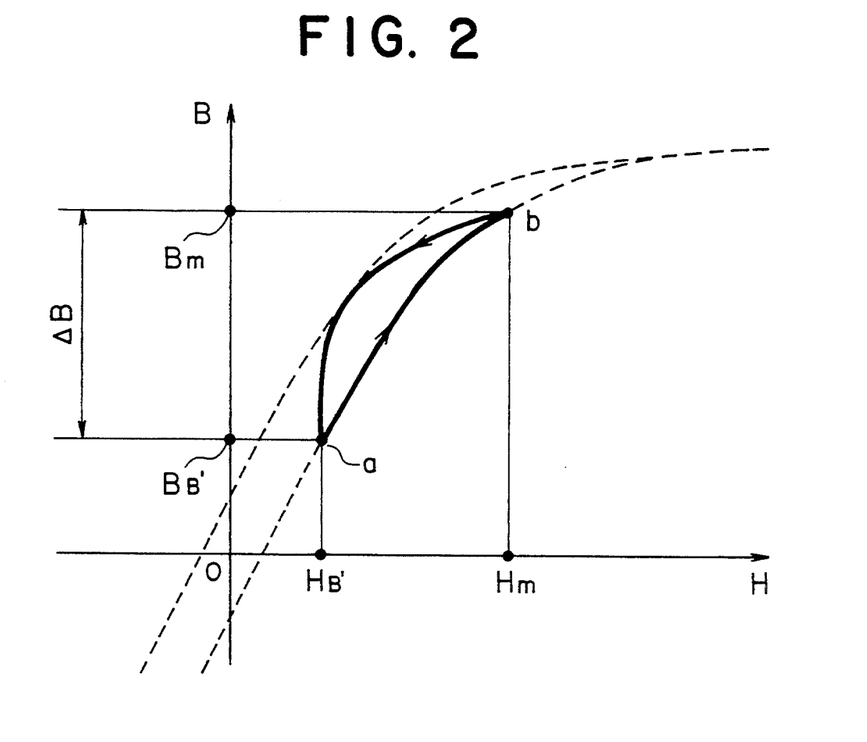
FIG. 2 is a graph showing the operating B-H hysteresis loop of a magnetic core used in the circuit of FIG. 1.

FIG. 2 schematically shows an operating B-H hysteresis loop of the magnetic core 2 after the short-circuiting of the ion source 4 in the circuit of FIG. 1.

The operation of the surge current-suppressing circuit for the high-voltage DC power supply will be explained referring to FIGS. 1 and 2. First, before the short-circuiting of the ion source 4, namely in the normal operation state, an operating point of the magnetic core 2 is at a magnetic flux density $B_B'$ determined by DC magnetization $H_B'$ generated by DC current $I_B'$ stationally flowing from the high-voltage DC power supply 41 via the regulator tube 42.

Here, $H_B'$ is determined by the following equation:

$$H_{B'} = \frac{N_P \cdot I_{B'}}{le} \ (A/m) \tag{1}$$

$N_p$: Number of winding in the primary winding.

Mean magnetic path length (m) of the magnetic core.

When the ion source 4 is short-circuited, namely when the switch 6 is turned on, the regulator tube 42 is cut off so that the current $I_B'$ supplied from the high-voltage DC power supply 41 is prevented from flowing into the ion source 4. However, by electric charge stored in the stray capacitance 1, discharge current $i_d$ is caused to flow into the ion source 4 in a time τ. This current is called "surge current". The surge blocker "A" prevents the surge current from flowing into the ion source 4. The magnetic core 2 in the surge blocker A serves to prevent the flow of the surge current to the extent shown by a voltage.time product determined by the following equation:

$$\int_0^\tau v_P \cdot dt = N_P \cdot A_e \cdot \Delta B \ (V \cdot s) \tag{2}$$

$v_p$: Voltage in the primary winding,
$A_e$: Effective cross section (m²) of the magnetic core, and
$\Delta B$: Operating magnetic flux density range, and suppress the surge current to a current wave height expressed by the following formula:

$$I_D = \frac{H_m \cdot le}{N_P} \ (A), \tag{3}$$

which is determined by the maximum magnetization $H_m$:

$$H_m \simeq \frac{\Delta B}{\mu_{rp}} + H_{B'} \ (A/m) \tag{4}$$

$H_{B'}$: DC magnetization corresponding to $B_{B'}$, and
$\mu_{rp}$: Relative pulse permeability.

The above maximum magnetization $H_m$ corresponds to the maximum magnetic flux density:

$$B_m = \Delta B + B_{B'}(T). \tag{5}$$

Based on the above principle, to keep the surge current $I_D$ equal to or lower than a permissible level $I_{Dp}$ which depends upon the circuit, the following formulae (6) and (7) should be satisfied:

$$\Delta B = \frac{\int_0^\tau v_P \cdot dt}{N_P \cdot A_e} \leq B_{mp} - B_{B'} \tag{6}$$

$$\frac{\Delta B \cdot le}{\mu_{rp} \cdot N_P} < I_{Dp} - I_{B'} \tag{7}$$

The formula (6) is derived from the formulae (2) and (5), in which $\Delta B$ represents an operating magnetic flux density range, and $B_{mp}$ represents a maximum magnetic flux density at which the magnetic core is operable. The formula (7) is derived from the formulae (1), (3) and (4), in which $\mu_{rp}$, represents an effective relative pulse permeability. With respect to the effective relative pulse permeability $\mu_{rp}$ please refer to JIS Handbook, Electronics, "Test Methods of Coil and Transformer Ferrite Magnetic Cores C2562, published by the Japan Standard Association.

In the design of an actual surge blocker, the voltage-time product, $I_{B'}$ and $B_{B'}$ are determined by the specifications of a neutral beam injector. In addition, for the purpose of miniaturization of the magnetic cores at $N_p=1$ turn, $B_{mp}$ should be as large as possible. However, $B_{mp}$ is inherently restricted by the materials of the magnetic cores. $B_B'$ and $\mu_{rp}$ are also values determined by the magnetic core materials. Accordingly, appropriate magnetic core materials should be selected.

To achieve the magnetic core design satisfying both formulae (6) and (7), it is important to select proper materials and determine appropriate Ae and le.

As is clear from the formula (6), the larger $(B_{mp}-B_B')$, the smaller Ae, enabling the miniaturization of the magnetic core.

Figure 3:
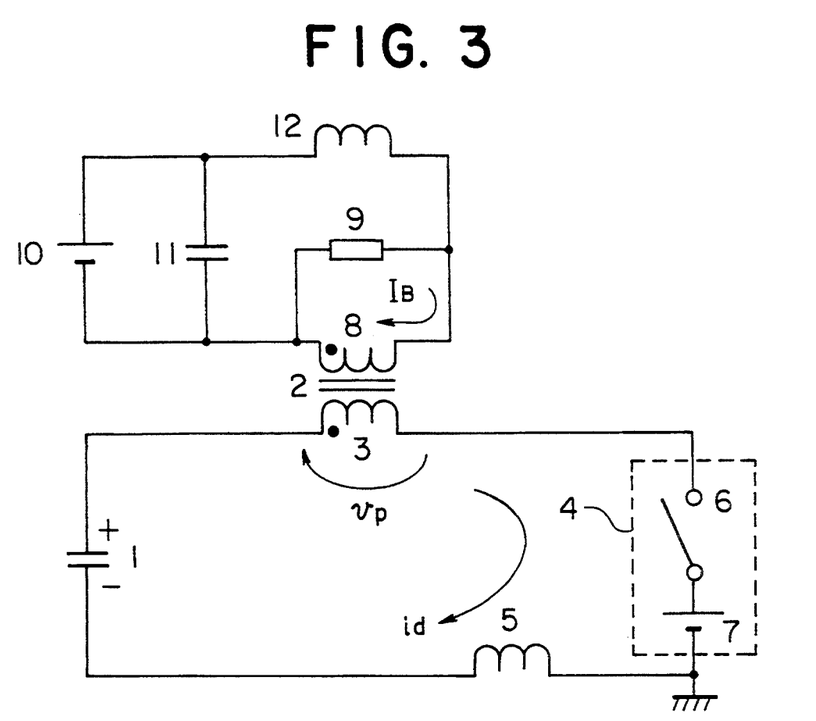
FIG. 3 is a schematic view showing a surge current-suppressing circuit including a bias circuit.
Figure 4:
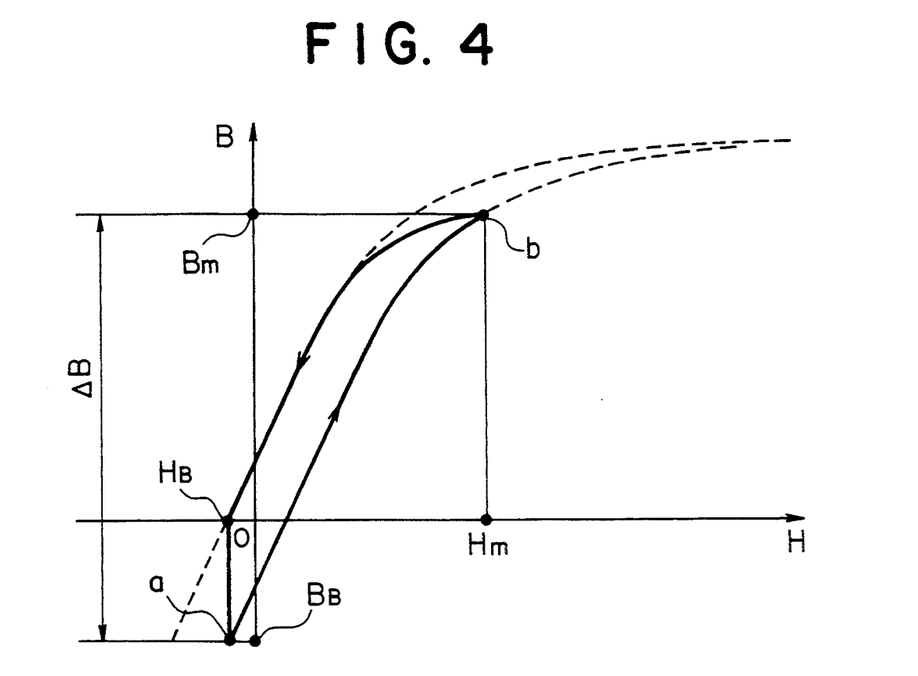
FIG. 4 is a graph showing the operating B-H hysteresis loop of a magnetic core used in the circuit of FIG. 3.

FIG. 3 shows an improvement in which the operating magnetic flux density range ΔB is increased in the system shown in FIG. 1. In FIG. 3, 10 denotes a bias DC power supply, and 11 and 12 a capacitor and an inductance for suppressing surge voltage induced in the secondary winding at the time of short-circuiting of the ion source. In this circuit, since the bias current $I_B$ can be caused to flow in the direction shown by the arrow, the operating magnetic flux density range ΔB can be increased as shown in FIG. 4, enabling the further miniaturization of the magnetic core 2. Incidentally, in FIG. 4, $$H_B = \frac{N_P \cdot I_B' - N_S \cdot I_B}{le} \; (A/m) \qquad (8)$$

$N_S$: Number of winding in the secondary winding.
$B_B$ represents a magnetic flux density at $H_B$ determined by the above formula. Incidentally, with respect to the details of the accelerator for the neutral beam injector, please refer to, for instance, Watanabe et al., "Composition of the Power Supply System of JT-60 Active Beam Source and Suppression of Surge Current, "The Japan Atomic Energy Research Institute, JAERI-M 86-104, July 1986.

In the surge current-suppressing magnetic device in the above accelerator, a neutral beam accelerator having relatively low acceleration voltage of 100 keV and 100 A is used because the nuclear fusion reactor itself is still in the research stage. At present, the magnetic core is made of Ni-Zn ferrite showing as low a saturation magnetic flux density as about 0.35 T, and a large number of Ni-Zn ferrite magnetic cores of about 500 mm in diameter are stacked. However, a neutral beam injector to be used in the future experimental nuclear fusion reactor is expected to be operated at a high acceleration voltage of 1 MeV and 50 A. In this case, if the surge blocker is constituted by stacked magnetic cores of Ni-Zn ferrite, the total length of the stacked magnetic cores would become more than 20 m. Accordingly, from the aspect of weight and space, it is totally impractical to use Ni-Zn ferrite magnetic cores.

Alternatively, to minimize the magnetic core size, it is possible to increase ΔB by providing a bias circuit shown in FIG. 3. However, since the Ni-Zn ferrite shows a squareness ratio of 0.6 or less in a DC magnetic curve and a coercive force of several tens A/m or more, bias current $I_B$ is inevitably large. Accordingly, the bias circuit is made large, thereby restricting a practically operating magnetic flux density range to 0.3 T or so. Thus, this is not a promising way for the reduction of the magnetic core size.

With respect to the magnetic core materials, amorphous alloy materials showing higher permeabilities (described in Japanese Patent Publication No. 55-19976) and iron-base fine crystalline alloys showing higher permeabilities and higher saturation magnetic flux densities (described in EP 87114568.6) than crystalline alloys are known. However, they have never been used for magnetic devices for suppressing surge current in the accelerator for the neutral beam injector. Thus, their actual operations have been totally unpredictable.

OBJECT AND SUMMARY OF THE INVENTION

Accordingly, an object of the present invention is to provide a magnetic device for suppressing surge current in the accelerator, which shows sufficient surge current-suppressing function and is extremely miniaturized as compared to the conventional ones.

Another object of the present invention is to provide a surge current-suppressing circuit comprising such a magnetic device.

As a result of intense research in view of the above objects, the inventors have found that by using a magnetic core constituted by an interlaminar-insulated thin ribbon of an amorphous magnetic alloy or an iron-base fine crystalline soft magnetic alloy, the surge current in the accelerator can be greatly suppressed. The present invention is based upon these findings.

The magnetic device for suppressing surge current in an accelerator according to one embodiment of the present invention is inserted between a high-voltage DC power supply and a load for suppressing the surge current generated when electric charge stored in a stray capacitance existing between the high-voltage DC power supply and the load is released at the time of short-circuiting of the load, the magnetic device comprising a magnetic core constituted by interlaminar-insulated thin ribbons of an amorphous magnetic alloy.

The magnetic device for suppressing surge current in an accelerator according to another embodiment of the present invention is inserted between a high-voltage DC power supply and a load for suppressing the surge current generated when electric charge stored in a stray capacitance existing between the high-voltage DC power supply and the load is released at the time of short-circuiting of the load, the magnetic device comprising a magnetic core constituted by interlaminar-insulated thin ribbons of an iron-base fine crystalline soft magnetic alloy having the composition represented by the general formula:

$$(Fe_{1-a}M_a)_{100-x-y-z-\alpha}Cu_xSi_yB_zM'_\alpha$$

wherein M is Co and/or Ni, M' is at least one element selected from the group consisting of Nb, W, Ta, Zr, Hf, Ti and Mo, and a, x, y, z and α respectively satisfy $0 \leq a \leq 0.5$, $0.1 \leq x < 3$, $0 \leq y \leq 30$, $0 \leq z \leq 25$, $5 \leq y+z \leq 30$, $0.1 \leq \alpha \leq 30$, at least 50% of the alloy structure being fine crystal grains made of a bcc Fe solid solution having an average crystal grain size of 1000Å or less when determined from a maximum size of each crystal grain.

The surge current-suppressing circuit for an accelerator according to a further embodiment of the present invention comprises a magnetic device inserted between a high-voltage DC power supply and an ion source for suppressing surge current generated when electric charge stored in a stray capacitance existing between the high-voltage DC power supply and the load is released at the time of short-circuiting of the load, the magnetic device comprising a magnetic core constituted by interlaminar-insulated thin ribbons of an amorphous magnetic alloy.

The surge current-suppressing circuit for an accelerator according to a further embodiment of the present invention comprises a magnetic device inserted between a high-voltage DC power supply and an ion source for suppressing surge current generated when electric charge stored in a stray capacitance existing between the high-voltage DC power supply and the load is released at the time of short-circuiting of the load, the magnetic device comprising a magnetic core constituted by interlaminar-insulated thin ribbons of an iron-base fine crystalline soft magnetic alloy having the composition represented by the general formula:

$$(Fe_{1-a}M_a)_{100-x-y-z-\alpha}Cu_xSi_yB_zM'_\alpha$$

wherein M is Co and/or Ni, M' is at least one element selected from the group consisting of Nb, W, Ta, Zr, Hf, Ti and Mo, and a, x, y, z and α respectively satisfy $0 \leq a \leq 0.5$, $0.1 \leq x \leq 3$, $0 \leq y \leq 30$, $0 \leq z \leq 25$, $5 \leq y+z \leq 30$, $0.1 \leq \alpha \leq 30$, at least 50% of the alloy structure being fine crystal grains made of a bcc Fe solid solution having an average crystal grain size of 1000Å or less when determined from a maximum size of each crystal grain.

DETAILED DESCRIPTION OF THE INVENTION

In the present invention, the magnetic core in the magnetic device is constituted by an amorphous magnetic alloy ribbon or an iron-base fine crystalline soft magnetic alloy ribbon, because they show higher saturation magnetic flux densities than the Ni-Zn ferrite, thereby enabling the miniaturization of the magnetic core. In addition, because they show larger relative pulse permeabilities $\mu_{rp}$ than the Ni-Zn ferrite, larger surge current-suppressing effects can be obtained.

The thin ribbons of amorphous magnetic alloys or iron-base fine crystalline soft magnetic alloys are insulated in the magnetic cores. The interlaminar insulation of the magnetic devices can be achieved by conventionally known techniques such as the insertion of insulation films or coatings between the adjacent ribbon layers.

With respect to the amorphous magnetic alloy ribbons, to achieve the miniaturization of the magnetic cores, they are preferably made of iron-base amorphous magnetic alloys having high saturation magnetic flux densities.

The preferred iron-base amorphous magnetic alloy has the composition represented by the formula:

$$(Fe_{1-a}M_a)_{100-y-z-\alpha}Si_yB_zM'_\alpha X_\beta$$

wherein M is Co and/or Ni, M' is at least one transition metal element, X is at least one element selected from the group consisting of C, Ge, P, Ga, Sb, In, Be and As, and a, y, z, α and β respectively satisfy $0 \leq a \leq 0.5$, $0 \leq y \leq 25$, $5 \leq z \leq 35$, $10 \leq y+z \leq 35$, $0 \leq \alpha \leq 10$ and $0 \leq \beta \leq 10$.

Alternatively, the magnetic core in the magnetic device according to the present invention may be constituted by thin ribbons of iron-base soft magnetic alloys. The preferred iron-base fine crystalline soft magnetic alloy has the composition represented by the general formula:

$$(Fe_{1-a}M_1)_{100-x-y-z-\alpha}Cu_xSi_yB_zM'_\alpha$$

wherein M is Co and/or Ni, M' is at least one element selected from the group consisting of Nb, W, Ta, Zr, Hf, Ti and Mo, and a, x, y, z and α respectively satisfy $0 \leq a \leq 0.5$, $0.1 \leq x \leq 3$, $0 \leq y \leq 30$, $0 \leq z \leq 25$, $5 \leq y+z \leq 30$ and $0.1 \leq \alpha \leq 30$, at least 50% of the alloy structure being fine crystal grains having an average crystal grain size of 1000Å or less. This iron-base soft magnetic alloy is described in EP 87114568.6.

This iron-base fine crystalline soft magnetic alloy may contain at least one element selected from the group consisting of V, Cr, Mn, Al, platinum group elements, Sc, Y, rare earth elements, Au, Zn, Sn and Re in an amount of 10 atomic % or less, to improve its corrosion resistance and magnetic properties. Further, to facilitate the production of amorphous phases and to control its Curie temperature, the iron-base fine crystalline soft magnetic alloy may further contain at least one element selected form the group consisting of C, Ge, P, Ga, Sb, In, Be and As in an amount of 10 atomic % or less.

Thus, the more preferred Fe-base fine crystalline soft magnetic alloy has the composition represented by the general formula:

$$(Fe_{1-a}M_a)_{100-x-y-z-\alpha-\beta-\gamma}Cu_xSi_yB_zM'_\alpha M''_\beta X_{65}$$

wherein M is Co and/or Ni, M' is at least one element selected from the group consisting of Nb, W, Ta, Zr, Hf, Ti and Mo, M" is at least one element selected from the group consisting of V, Cr, Mn, Al, elements in the platinum group, Sc, Y, rare earth elements, Au, Zn, Sn and Re, X is at least one element selected from the group consisting of C, Ge, P, Ga, Sb, In, Be and As, and a, x, y, z, α, β and γ respectively satisfy $0 \leq a \leq 0.5$, $0.1 \leq x \leq 3$, $0 \leq y \leq 30$, $0 \leq z \leq 25$, $5 \leq y+z \leq 30$, $0.1 \leq \alpha \leq 30$, $0 \leq \beta \leq 10$ and $0 \leq \gamma \leq 10$, at least 50% of the alloy structure being fine crystal grains having an average crystal grain size of 1000Å or less.

The magnetic core constituted by the iron-base fine crystalline soft magnetic alloy ribbon shows, as compared with the conventional Ni-Zn ferrite, a larger saturation magnetic flux density, thereby enabling the miniaturization of the magnetic core, and also a larger relative pulse permeability $\mu_{rp}$, thereby exhibiting larger surge current-suppressing effects. Further, since the iron-base fine crystalline soft magnetic alloy ribbon shows a smaller magnetostriction than the iron-base amorphous alloy ribbon, the magnetic core constituted by the iron-base fine crystalline soft magnetic alloy ribbon suffers from less deterioration of magnetic properties due to an external stress in the assembling of the magnetic device than the amorphous counterpart.

To keep the surge current wave height low, it is preferable that the magnetic device shows a relative pulse permeability $\mu_{rp}$ of 1000 or more at a pulse width of 1 μs and at an operating magnetic flux density range (ΔB) of 0.2 T.

Further, in order to increase the operating magnetic flux density range ΔB by adding the bias circuit, it is preferable that the magnetic device shows a squareness ratio of 0.7 or more in a DC magnetic curve.

The present invention will be described in further detail referring to the following Example, without intention of restricting the scope of the present invention.

EXAMPLE 1

Table 1 shows unit magnetic core specimens constituted by amorphous magnetic alloy ribbons insulated with polyimide films, together with those constituted by Ni-Zn ferrite with respect to their compositions and magnetic properties. Table 2 shows the shapes of the unit magnetic core specimens listed in Table 1.

Figure 5:
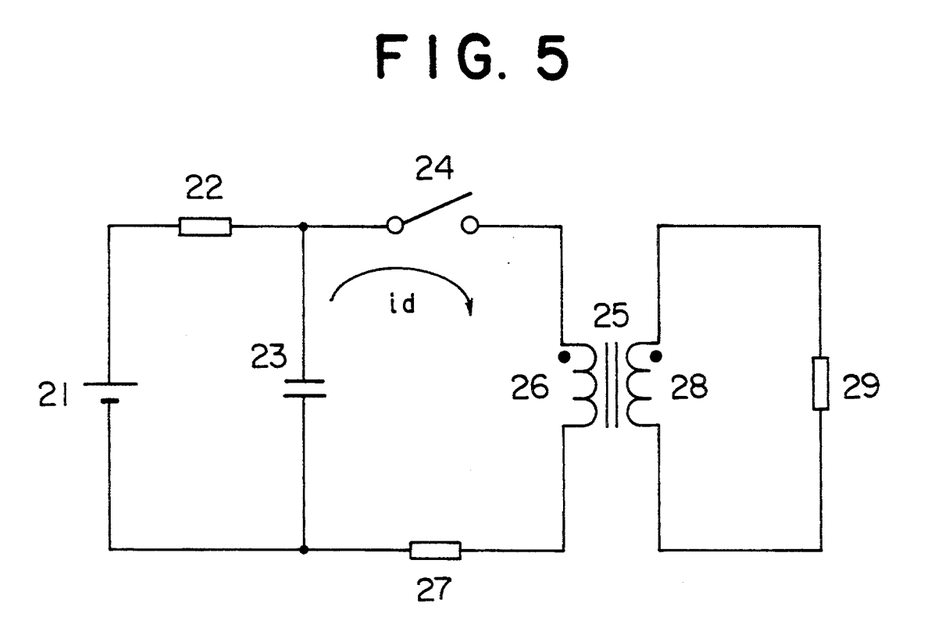
FIG. 5 is a schematic view showing a circuit including no bias circuit for evaluating a surge current-suppressing magnetic device.

In this Example, the circuit shown in FIG. 5 was used to evaluate the effects of suppressing the surge current of an accelerator. In FIG. 5, 21 denotes a high-voltage DC power supply, 22 a resistor for charging a capacitor 23, 24 a triggered spark gap, 25 a specimen, 26 a primary winding for the specimen, 27 a resistor on the primary side, 28 a secondary winding for the specimen, 29 a resistor on the secondary side for suppressing ringing current determined by the capacitor 23, an inductance of the primary winding 26 and the resistor 27 and consuming its energy after the turn-on of the triggered spark gap 24.

Table 3 shows the numbers of unit magnetic cores having the shapes shown in Table 2 necessary for suppressing the wave height $I_D$ of the surge current $i_d$ (generated after the turn-on of the triggered spark gap 24 under the measurement conditions shown in Table 3 in the above evaluation circuit, to 5 kA or less (namely, permitted current wave height $I_{Dp}$=5 kA), together with the total magnetic core weights and the actual wave heights $I_D$ achieved under such conditions. As shown by the formulae (6) and (7), since the voltage time product and the number of windings are determined by the circuit structure, Ae should be changed relative to ΔB determined by the core material to achieve the wave height $I_D$ of 5 kA or less. That is, the effective cross section Ae of the magnetic core in the formula (2) is expressed as $Ae_1{}_{unit}$×Number of unit magnetic cores, wherein $Ae_1{}_{unit}$ is an effective cross section of one unit magnetic core. Accordingly, the reduction of the number of the unit magnetic cores leads to the miniaturization of the overall magnetic core.

It is clear from Table 3 that the magnetic core size is extremely smaller in the present invention than in the comparative example to achieve the same performance.

TABLE 1

| Sample No.[1] | Composition (atomic %) | $B_{800}$[2] (T) | $B_8$[3] (T) | $\mu_{rp}$[4] (10 μs) | $\mu_{rp}$[5] (1 μs) | Specific Gravity (kg/m³) |
|---|---|---|---|---|---|---|
| 1 | $Fe_{81}B_{13.5}Si_{3.5}C_2$ | 1.43 | 0.36 | 4,700 | 1,500 | $7.3 \times 10^3$ |
| 2 | $Fe_{78}B_{13}Si_9$ | 1.41 | 0.29 | 4,300 | 1,600 | $7.2 \times 10^3$ |
| 3 | $Fe_{79}B_{16}Si_5$ | 1.42 | 0.30 | 3,400 | 1,200 | $7.2 \times 10^3$ |
| 4 | $Fe_{70}Ni_{7.5}Si_{13.5}B_9$ | 1.37 | 0.33 | 3,900 | 1,100 | $7.2 \times 10^3$ |
| 5 | $Fe_{77}Ni_{2.5}Si_{11.5}B_9$ | 1.43 | 0.41 | 4,200 | 1,300 | $7.2 \times 10^3$ |
| C-1 | Ni—Zn Ferrite | 0.48 | 0.17 | 1,400 | 1,100 | $5.1 \times 10^3$ |

Note [1]:
Sample Nos. 1–5: Samples of the present invention.
Sample No. C-1: Comparative sample.
Sample Nos. 1–5 were constituted by thin, amorphous, magnetic alloy ribbons insulated with polyimide films between adjacent ribbon layers.
[2]: Magnetic flux density at DC magnetization of 800 A/m.
[3]: Magnetic flux density at DC magnetization of 8 A/m.
[4]: Relative pulse permeability at pulse width of 10 μs and ΔB of 0.2 T.
[5]: Relative pulse permeability at pulse width of 1 μs and ΔB of 0.2 T.

TABLE 2

| Sample No.[1] | Composition (atomic %) | Magnetic Core Size (mm) | Effective Cross Section Ae (m²) | Average Magnetic Path Length le (m) | Weight W (kg) |
|---|---|---|---|---|---|
| 1 | $Fe_{81}B_{13.5}Si_{3.5}C_2$ | 500φ × 2600 × 25 | $2.0 \times 10^{-3}$ | 1.19 | 17.4 |
| 2 | $Fe_{78}B_{13}Si_9$ | 500φ × 2600 × 25 | $2.0 \times 10^{-3}$ | 1.19 | 17.1 |
| 3 | $Fe_{79}B_{16}Si_5$ | 500φ × 2600 × 25 | $2.0 \times 10^{-3}$ | 1.19 | 17.1 |
| 4 | $Fe_{70}Ni_{7.5}Si_{13.5}B_9$ | 500φ × 2600 × 25 | $2.0 \times 10^{-3}$ | 1.19 | 17.1 |
| 5 | $Fe_{77}Ni_{2.5}Si_{11.5}B_9$ | 500φ × 2600 × 25 | $2.0 \times 10^{-3}$ | 1.19 | 17.1 |
| C-1 | Ni—Zn Ferrite | 500φ × 2600 × 25 | $3.0 \times 10^{-3}$ | 1.19 | 18.2 |

Note [1]:
Sample Nos. 1–5: Samples of the present invention.
Sample No. C-1: Comparative sample.
Sample Nos. 1–5 were constituted by thin, amorphous, magnetic alloy ribbons insulated with polyimide films between adjacent ribbon layers.

TABLE 3

| Sample No.[1] | Composition (atomic %) | Number Of Unit Magnetic Core | Total Weight of Magnetic Core (kg) | Wave Height of Surge Current $I_D$ (kA) |
|---|---|---|---|---|
| 6 | $Fe_{81}B_{13.5}Si_{3.5}C_2$ | 18 | 313 | 4.7 |
| 7 | $Fe_{78}B_{13}Si_9$ | 18 | 308 | 4.8 |
| 8 | $Fe_{79}B_{16}Si_5$ | 18 | 308 | 4.6 |
| 9 | $Fe_{70}Ni_{7.5}Si_{13.5}B_9$ | 20 | 342 | 4.9 |
| 10 | $Fe_{77}Ni_{2.5}Si_{11.5}B_9$ | 20 | 342 | 4.8 |

TABLE 3-continued

| Sample No.[1] | Composition (atomic %) | Number Of Unit Magnetic Core | Total Weight of Magnetic Core (kg) | Wave Height of Surge Current $I_D$ (kA) |
|---|---|---|---|---|
| C-2 | Ni—Zn Ferrite | 43 | 783 | 4.7 |

Note [1]:
Sample Nos. 6–10: Samples of the present invention.
Sample No. C-2: Comparative sample.
Sample Nos. 6–10 were constituted by thin, amorphous, magnetic alloy ribbons insulated with polyimide films between adjacent ribbon layers.
Measurement conditions:
Input DC power supply voltage E = 100 kV.
Resistor 27 (primary winding side) $R_p$ = 0.05 Ω.
Primary and secondary windings: Both 1 turn.
Capacitance C = 20 nF
Resistor 29 (secondary winding side) $R_s$ = 20 Ω.

TABLE 4

| Sample No.[1] | Composition (atomic %) | $\mu_{rp}$[2] (1 μs) | Wave Height of Surge Current $I_D$ (kA) |
|---|---|---|---|
| 11 | $Fe_{81}B_{13.5}Si_{3.5}C_2$ | 430 | 6.9 |
| 12 | $Fe_{81}B_{13.5}Si_{3.5}C_2$ | 640 | 5.9 |
| 13 | $Fe_{81}B_{13.5}Si_{3.5}C_2$ | 830 | 5.4 |
| 14 | $Fe_{78}B_{13}Si_9$ | 440 | 6.9 |
| 15 | $Fe_{78}B_{13}Si_9$ | 700 | 5.8 |
| 16 | $Fe_{78}B_{13}Si_9$ | 930 | 5.3 |
| 17 | $Fe_{70}Ni_{7.5}Si_{13.5}B_9$ | 460 | 7.1 |
| 18 | $Fe_{70}Ni_{7.5}Si_{13.5}B_9$ | 670 | 6.6 |
| 19 | $Fe_{70}Ni_{7.5}Si_{13.5}B_9$ | 900 | 5.4 |

Note [1]:
Sample Nos. 11–19: Samples of the present invention. Sample Nos. 11–19 were constituted by thin, amorphous, magnetic alloy ribbons insulated with polyimide films between adjacent ribbon layers.
With respect to the shapes and numbers of unit magnetic cores and measurement conditions, they were the same as in Table 3.
[2]: Relative pulse permeability at a pulse width of 1 μs and ΔB of 0.2 T.

Incidentally, any of Sample Nos. 1–5 in this Example showed a relative pulse permeability $\mu_{rp}$ (1 μs) of 1000 or more at a pulse width of 1 μs and ΔB of 0.2 T (see Table 1). When specimens showing smaller relative pulse permeability $\mu_{rp}$ prepared under different heat treatment conditions were used as shown in Table 4, only small effects of suppressing surge current wave height could be obtained even though amorphous alloy ribbons of the same compositions were used. Accordingly, it is desired that the relative pulse permeability $\mu_{rp}$ (1 μs) is 1000 or more.

EXAMPLE 2

Figure 6:
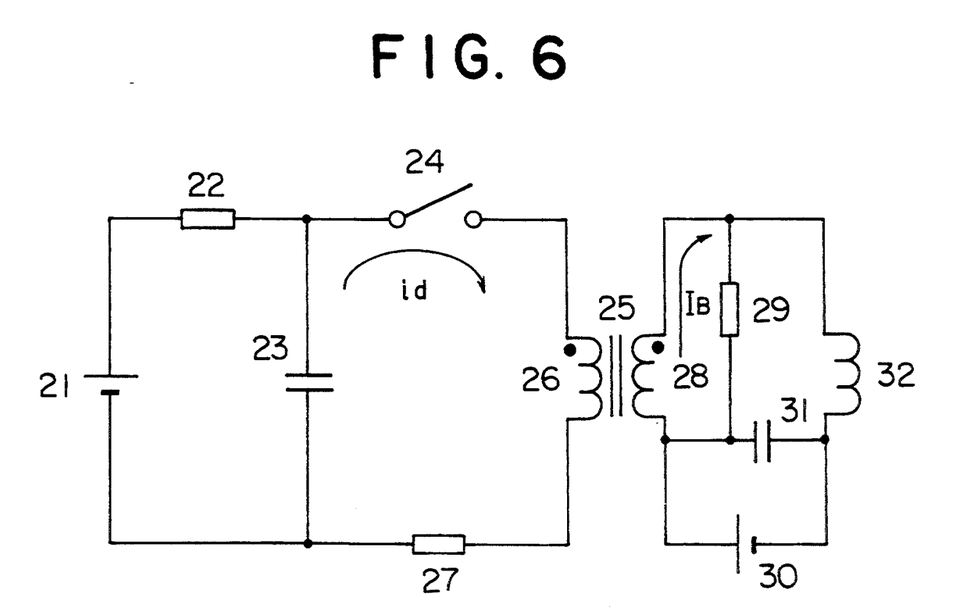
FIG. 6 is a schematic view showing a circuit including a bias circuit for evaluating a surge current-suppressing magnetic device.

In this Example, a circuit shown in FIG. 6 was used to evaluate the effects of suppressing surge current in the above high-voltage DC power supply. This circuit is constituted by adding a bias circuit to the evaluation circuit shown in FIG. 5 used in Example 1. In FIG. 6, 30 denotes a bias DC powder supply, 31 and 32 a capacitor and an inductance for preventing a spike voltage induced in the secondary winding 28 of the specimen 25 after the turn-on of the triggered spark gap 24 from being applied to the bias DC power supply 30.

Table 5 shows the numbers of unit magnetic cores shown in Tables 1 and 2 necessary for suppressing the wave height $I_D$ of the surge current $i_d$ (generated after the turn-on of the triggered spark gap 24 under the measurement conditions shown in Table 5 in the above evaluation circuit) to 5 kA or less (namely, permitted current wave height $I_{Dp}$ = 5 kA), together with the total magnetic core weights and the actual wave heights $I_D$ achieved under such conditions.

TABLE 5

| Sample No.[1] | Composition (atomic %) | Number of Unit Magnetic Core | Total Weight of Magnetic Core (kg) | Wave Height of Surge Current $I_D$ (kA) |
|---|---|---|---|---|
| 20 | $Fe_{81}B_{13.5}Si_{3.5}C_2$ | 12 | 209 | 4.6 |
| 21 | $Fe_{78}B_{13}Si_9$ | 12 | 205 | 4.7 |
| 22 | $Fe_{79}B_{16}Si_5$ | 12 | 205 | 4.9 |
| 23 | $Fe_{70}Ni_{7.5}Si_{13.5}B_9$ | 13 | 222 | 4.7 |
| 24 | $Fe_{77}Ni_{2.5}Si_{11.5}B_9$ | 12 | 205 | 4.8 |
| C-3 | Ni—Zn Ferrite | 22 | 400 | 4.8 |

Note [1]:
Sample Nos. 20–24: Samples of the present invention.
Sample No. C-3: Comparative sample.
Sample Nos. 20–24 were constituted by thin, amorphous, magnetic alloy ribbons insulated with polyimide films between adjacent ribbon layers.
Measurement conditions:
Input DC power supply voltage E = 100 kV.
Resistor 27 (primary winding side) $R_p$ = 0.05 Ω.
Bias magnetization $H_B$ = −8 A/m.
Capacitance C = 20 nF
Resistor 29 (secondary winding side) $R_s$ = 20 Ω.
Primary and secondary windings: Both 1 turn.

It is clear from Table 5 that the magnetic core size is extremely smaller in the present invention than in the comparative example to achieve the same performance.

Also, it is clear that in this Example, a relative pulse permeability $\mu_{rp}$ (1 μs) at a pulse width of 1 μs and ΔB of 0.2 T is desirably 1000 or more to reduce the surge current wave height $I_D$.

EXAMPLE 3

By using unit magnetic cores of 500 mm × 260 mm × 25 mm constituted by interlaminar-insulated thin ribbons of amorphous magnetic alloys showing different squareness ratios, the effects of suppressing surge current were examined in the circuit shown in FIG. 6. The results are shown in Table 6. The measurement conditions are shown in Table 6, in which the surge current wave height $I_D$ was kept at most 5 kA.

TABLE 6

| Sample No.[1] | Composition (atomic %) | $Br/B_{800}$[2] | Number of Unit Magnetic Core | Wave Height of Surge Current $I_D$ (kA) |
|---|---|---|---|---|
| 25 | $Fe_{81}B_{13.5}Si_{3.5}C_2$ | 0.81 | 7 | 4.7 |
| 26 | $Fe_{81}B_{13.5}Si_{3.5}C_2$ | 0.74 | 7 | 4.8 |
| 27 | $Fe_{81}B_{13.5}Si_{3.5}C_2$ | 0.61 | 9 | 4.8 |
| 28 | $Fe_{78}B_{13}Si_9$ | 0.77 | 7 | 4.6 |
| 29 | $Fe_{78}B_{13}Si_9$ | 0.73 | 7 | 4.7 |
| 30 | $Fe_{78}B_{13}Si_9$ | 0.56 | 10 | 4.9 |
| 31 | $Fe_{70}Ni_{7.5}Si_{13.5}B_9$ | 0.83 | 7 | 4.6 |
| 32 | $Fe_{70}Ni_{7.5}Si_{13.5}B_9$ | 0.71 | 8 | 4.7 |
| 33 | $Fe_{70}Ni_{7.5}Si_{13.5}B_9$ | 0.63 | 10 | 4.9 |
| C-3 | Ni—Zn Ferrite | 0.30 | 22 | 4.8 |

Note [1]:
Sample Nos. 25–33: Samples of the present invention.
Sample No. C-3: Comparative sample.
Sample Nos. 25–33 were constituted by thin, amorphous, magnetic alloy ribbons insulated with polyimide films between adjacent ribbon layers.
[2]: Squareness ratio measured at DC magnetization of 800 A/m.
Measurement conditions:
Input DC power supply voltage E = 100 kV.
Capacitance C = 20 nF.
Resistor 27 (primary winding side) $R_p$ = 0.05 Ω.
Resistor 29 (secondary winding side) $R_s$ = 20 Ω.
Bias magnetization $H_B$ = −8 A/m.
Primary and secondary windings: Both 1 turn.

It is clear from Table 6 that the larger the squareness ratio $Br/B_{800}$ in a DC magnetic curve, the smaller the number of unit magnetic cores, facilitating the miniaturization of the entire magnetic cores. Particularly in the case of $Br/B_{800}$ of 0.7 or more, ΔB can be increased even at as small a bias magnetization $H_B$ as −8 A/m, meaning that the miniaturization of the entire magnetic cores can be effectively achieved.

EXAMPLE 4

It is clear from Table 8 that the magnetic core size is extremely smaller in the present invention than in the comparative example to achieve the same performance.

TABLE 7

| Sample No.[1] | Composition (atomic %) | $B_{800}$[2] (T) | $B_8$[3] (T) | $\mu_{rp}$[4] (10 μs) | $\mu_{rp}$[5] (1 μs) |
|---|---|---|---|---|---|
| 34 | $(Fe_{0.959}Co_{0.041})_{73.5}Cu_1Si_{13.5}B_9Nb_3$ | 1.30 | 0.43 | 12,000 | 3,100 |
| 35 | $Fe_{70.5}Cu_1Si_{20.5}B_5Nb_3$ | 1.08 | 0.26 | 14,000 | 2,900 |
| 36 | $(Fe_{0.73}Co_{0.27})_{73.5}Cu_1Si_{13.5}B_9Nb_3$ | 1.23 | 0.31 | 9,900 | 2,800 |
| 37 | $Fe_{75.5}Cu_1Si_{13.5}B_7Nb_3$ | 1.33 | 0.24 | 13,000 | 3,300 |
| 38 | $Fe_{72}Cu_1Si_{19}B_5Nb_3$ | 1.14 | 0.28 | 14,000 | 3,200 |
| 39 | $(Fe_{0.6}Co_{0.4})_{73.5}Cu_1Si_{13.5}B_9Nb_3$ | 1.27 | 0.34 | 11,000 | 2,900 |
| 40 | $Fe_{77}Cu_1Si_{10}B_9Nb_3$ | 1.42 | 0.31 | 10,000 | 2,300 |
| C-1 | Ni—Zn Ferrite | 0.48 | 0.17 | 1,400 | 1,100 |

Note [1]:
Sample Nos. 34–40: Samples of the present invention.
Sample No. C-1: Comparative sample.
Sample Nos. 34–40 were constituted by iron-base fine crystalline soft magnetic alloy ribbons insulated with MgO between adjacent ribbon layers.
[2]: Magnetic flux density at DC magnetization of 800 A/m.
[3]: Magnetic flux density at DC magnetization of 8 A/m.
[4]: Relative pulse permeability at a pulse width of 10 μs and ΔB of 0.2 T.
[5]: Relative pulse permeability at a pulse width of 1 μs and ΔB of 0.2 T.

TABLE 8

| Sample No.[1] | Composition (atomic %) | Number of Unit Magnetic Core | Total Weight of Magnetic Core (kg) | Wave Height of Surge Current $I_D$ (kA) |
|---|---|---|---|---|
| 41 | $(Fe_{0.959}Co_{0.041})_{73.5}Cu_1Si_{13.5}B_9Nb_3$ | 13 | 211 | 4.9 |
| 42 | $Fe_{70.5}Cu_1Si_{20.5}B_5Nb_3$ | 16 | 272 | 4.7 |
| 43 | $(Fe_{0.73}Co_{0.27})_{73.5}Cu_1Si_{13.5}B_9Nb_3$ | 14 | 241 | 4.8 |
| 44 | $Fe_{75.5}Cu_1Si_{13.5}B_7Nb_3$ | 14 | 239 | 4.6 |
| 45 | $Fe_{72}Cu_1Si_{19}B_5Nb_3$ | 15 | 256 | 4.5 |
| 46 | $(Fe_{0.6}Co_{0.4})_{73.5}Cu_1Si_{13.5}B_9Nb_3$ | 14 | 240 | 4.8 |
| 47 | $Fe_{77}Cu_1Si_{10}B_9Nb_3$ | 13 | 210 | 4.9 |
| C-3 | Ni—Zn Ferrite | 22 | 400 | 4.8 |

Note [1]:
Sample Nos. 41–47: Samples of the present invention.
Sample No. C-3: Comparative sample.
Sample Nos. 41–47 were constituted by iron-base fine crystalline soft magnetic alloy ribbons insulated with MgO between adjacent ribbon layers.
Measurement conditions:
Input DC power supply voltage E = 100 kV.
Resistor 27 (primary winding side) $R_p$ = 0.05 Ω.
Bias magnetization $H_B$ = −8 A/m.
Capacitance C = 20 nF
Resistor 29 (secondary winding side) $R_s$ = 20 Ω.
Primary and secondary windings: Both 1 turn.

Table 7 shows the comparison in magnetic properties between toroidal magnetic cores constituted by iron-base fine crystalline soft magnetic alloy ribbons having an average crystal grain size of 1000 Å or less when measured in maximum size and insulated with MgO between adjacent ribbon layers, and a comparative magnetic core made of Ni-Zn ferrite. Any of unit magnetic cores was in a toroidal shape of 500 mm in outer diameter, 260 mm in inner diameter and 25 mm in height.

In this Example, the circuit shown in FIG. 6 was used to evaluate the effects of suppressing surge current in the accelerator.

Table 8 shows the numbers of unit magnetic cores having the above shape (500 mm×260 mm×25 mm) necessary for suppressing the wave height $I_D$ of the surge current $i_d$ (generated after the turn-on of the triggered spark gap 24 under the measurement conditions shown in Table 8 in the above evaluation circuit) to 5 kA or less (namely, permitted current wave height $I_{Dp}$=5 kA), together with the total magnetic core weights and the actual wave heights $I_D$ achieved under such conditions.

Further, the iron-base fine crystalline soft magnetic alloy ribbons constituting the magnetic cores of the present invention showed saturation magnetostrictions $\gamma_s$ of about $\pm 10 \times 10^{-6}$ or less, which are much smaller than those of the iron-base amorphous magnetic alloy ribbons. Accordingly, it is clear that the magnetic cores constituted by the iron-base fine crystalline soft magnetic alloy ribbons suffer from only extremely small deterioration of magnetic properties due to an external stress.

EXAMPLE 5

Table 9 shows the numbers of unit magnetic cores having the above shapes necessary for suppressing the wave height $I_D$ of the surge current $i_d$ (generated after the turn-on of the triggered spark gap 24 under the measurement conditions shown in Table 9 in the evaluation circuit shown in FIG. 5 using the magnetic cores in Example 4) to 2 kA or less (namely, permitted current wave height $I_{Dp}$=2 kA), together with the total magnetic core weights and the actual wave heights $I_D$ achieved under such conditions.

TABLE 9

| Sample No.[1] | Composition (atomic %) | Number of Unit Magnetic Core | Total Weight of Magnetic Core (kg) | Wave Height of Surge Current $I_D$ (kA) |
| --- | --- | --- | --- | --- |
| 48 | $Fe_{81}B_{13.5}Si_{3.5}C_2$ | 25 | 435 | 1.8 |
| 49 | $Fe_{78}B_{13}Si_9$ | 26 | 446 | 1.9 |
| 50 | $Fe_{79}B_{16}Si_5$ | 28 | 481 | 1.9 |
| 51 | $Fe_{70}Ni_{7.5}Si_{13.5}B_9$ | 29 | 497 | 1.8 |
| 52 | $Fe_{77}Ni_{2.5}Si_{11.5}B_9$ | 29 | 496 | 1.8 |
| 53 | $(Fe_{0.959}Co_{0.041})_{73.5}Cu_1Si_{13.5}B_9Nb_3$ | 16 | 261 | 1.9 |
| 54 | $Fe_{70.5}Cu_1Si_{20.5}B_5Nb_3$ | 19 | 323 | 1.8 |
| 55 | $(Fe_{0.73}Co_{0.27})_{73.5}Cu_1Si_{13.5}B_9Nb_3$ | 17 | 294 | 1.8 |
| 56 | $Fe_{75.5}Cu_1Si_{13.5}B_7Nb_3$ | 16 | 273 | 1.7 |
| 57 | $Fe_{72}Cu_1Si_{19}B_5Nb_3$ | 18 | 307 | 1.9 |
| 58 | $(Fe_{0.6}Co_{0.4})_{73.5}Cu_1Si_{13.5}B_9Nb_3$ | 18 | 309 | 1.9 |
| 59 | $Fe_{77}Cu_1Si_{10}B_9Nb_3$ | 18 | 292 | 1.8 |
| C-4 | Ni—Zn Ferrite | 80 | 1455 | 1.9 |

Note [1]:
Sample Nos. 48–59: Samples of the present invention.
Sample No. C-4: Comparative sample.
Measurement conditions:
Input DC power supply voltage E = 100 kV.
Capacitance C = 20 nF
Resistor 27 (primary winding side) $R_p$ = 0.05 Ω.
Resistor 29 (secondary winding side) $R_s$ = 50 Ω.
Primary and secondary windings: Both 1 turn.

It is clear from Table 9 that the magnetic core size is extremely smaller in the present invention than in the comparative example to achieve the same performance. Further, since the iron-base fine crystalline soft magnetic alloy ribbons show larger relative pulse permeabilities $\mu_{rp}$ than the iron-base amorphous alloy ribbons, the magnetic cores constituted by the iron-base fine crystalline soft magnetic alloy ribbons can be more miniaturized than those of the amorphous counterparts.

EXAMPLE 6

By using unit magnetic cores of 500 mm×260 mm×25 mm constituted by iron-base fine crystalline soft magnetic alloy ribbons having the compositions shown in Table 10 and insulated with MgO between adjacent ribbon layers (showing different squareness ratios), the effects of suppressing surge current were examined in the circuit shown in FIG. 6. The results are shown in Table 10. The measurement conditions are shown in Table 10, in which the surge current wave height $I_D$ was kept at most 5 kA.

It is clear from Table 10 that the larger the squareness ratio $Br/B_{800}$ in a DC magnetic curve, the smaller the number of unit magnetic cores, facilitating the miniaturization of the entire magnetic cores. Particularly in the case of $Br/B_{800}$ of 0.7 or more, ΔB can be increased even at as small a bias magnetization $H_B$ as −8 A/m, meaning that the miniaturization of the entire magnetic cores can be effectively achieved.

EXAMPLE 7

With respect to specimens showing different squareness ratios as shown in Tables 6 and 10, the evaluation circuit shown in FIG. 6 was used to know the numbers of unit magnetic cores having the above shape necessary for suppressing the wave height $I_D$ of the surge current $i_d$ (generated after the turn-on of the triggered spark gap 24 under the measurement conditions shown in Table 11) to 2 kA or less (namely, permitted current wave height $I_D$=2 kA), together with the total magnetic core weights and the actual wave heights $I_D$ achieved under such conditions. The results are shown in Table 11.

TABLE 10

| Sample No.[1] | Composition (atomic %) | $Br/B_{800}$ [2] | Number of Unit Magnetic Core | Wave Height of Surge Current $I_D$ (kA) |
| --- | --- | --- | --- | --- |
| 60 | $(Fe_{0.959}Co_{0.041})_{73.5}Cu_1Si_{13.5}B_9Nb_3$ | 0.93 | 7 | 4.7 |
| 61 | $(Fe_{0.959}Co_{0.041})_{73.5}Cu_1Si_{13.5}B_9Nb_3$ | 0.76 | 7 | 4.9 |
| 62 | $(Fe_{0.959}Co_{0.041})_{73.5}Cu_1Si_{13.5}B_9Nb_3$ | 0.53 | 10 | 4.7 |
| 63 | $Fe_{75.5}Cu_1Si_{13.5}B_7Nb_3$ | 0.88 | 7 | 4.8 |
| 64 | $Fe_{75.5}Cu_1Si_{13.5}B_7Nb_3$ | 0.71 | 7 | 4.8 |
| 65 | $Fe_{75.5}Cu_1Si_{13.5}B_7Nb_3$ | 0.56 | 9 | 4.7 |
| 66 | $Fe_{77}Cu_1Si_{10}B_9Nb_3$ | 0.87 | 7 | 4.7 |
| 67 | $Fe_{77}Cu_1Si_{10}B_9Nb_3$ | 0.77 | 7 | 4.9 |
| 68 | $Fe_{77}Cu_1Si_{10}B_9Nb_3$ | 0.63 | 9 | 4.8 |
| C-3 | Ni—Zn Ferrite | 0.30 | 22 | 4.8 |

Note [1]:
Sample Nos. 60–68: Samples of the present invention.
Sample No. C-3: Comparative sample.
Sample Nos. 60–68 were constituted by iron-base fine crystalline soft magnetic alloy ribbons insulated with MgO between adjacent ribbon layers.
[2]: Squareness ratio measured at DC magnetization of 800 A/m.
Measurement conditions:
Input DC power supply voltage E = 100 kV.
Capacitance C = 20 nF.
Resistor 27 (primary winding side) $R_p$ = 0.05 Ω.
Resistor 29 (secondary winding side) $R_s$ = 20 Ω.
Bias magnetization $H_B$ = −8 A/m.
Primary and secondary windings: Both 1 turn.

TABLE 11

| Sample No.[1] | Composition (atomic %) | Number of Unit Magnetic Core | Total Weight of Magnetic Core (kg) | Wave Height of Surge Current $I_D$ (kA) |
|---|---|---|---|---|
| 60 | $Fe_{81}B_{13.5}Si_{3.5}C_2$ | 13 | 226 | 1.9 |
| 61 | $Fe_{81}B_{13.5}Si_{3.5}C_2$ | 14 | 241 | 1.9 |
| 62 | $Fe_{81}B_{13.5}Si_{3.5}C_2$ | 17 | 291 | 1.8 |
| 63 | $Fe_{78}B_{13}Si_9$ | 14 | 239 | 1.8 |
| 64 | $Fe_{78}B_{13}Si_9$ | 14 | 238 | 1.9 |
| 65 | $Fe_{78}B_{13}Si_9$ | 19 | 325 | 1.9 |
| 66 | $Fe_{70}Ni_{7.5}Si_{13.5}B_9$ | 15 | 257 | 1.8 |
| 67 | $Fe_{70}Ni_{7.5}Si_{13.5}B_9$ | 15 | 258 | 1.9 |
| 68 | $Fe_{70}Ni_{7.5}Si_{13.5}B_9$ | 20 | 342 | 1.9 |
| 69 | $(Fe_{0.959}Co_{0.041})_{73.5}Cu_1Si_{13.5}B_9Nb_3$ | 9 | 145 | 1.8 |
| 70 | $(Fe_{0.959}Co_{0.041})_{73.5}Cu_1Si_{13.5}B_9Nb_3$ | 9 | 146 | 1.9 |
| 71 | $(Fe_{0.959}Co_{0.041})_{73.5}Cu_1Si_{13.5}B_9Nb_3$ | 13 | 211 | 1.8 |
| 72 | $Fe_{75.5}Cu_1Si_{13.5}B_7Nb_3$ | 9 | 153 | 1.7 |
| 73 | $Fe_{75.5}Cu_1Si_{13.5}B_7Nb_3$ | 10 | 171 | 1.9 |
| 74 | $Fe_{75.5}Cu_1Si_{13.5}B_7Nb_3$ | 13 | 210 | 1.8 |
| 75 | $Fe_{77}Cu_1Si_{10}B_9Nb_3$ | 9 | 147 | 1.8 |
| 76 | $Fe_{77}Cu_1Si_{10}B_9Nb_3$ | 10 | 172 | 1.9 |
| 77 | $Fe_{77}Cu_1Si_{10}B_9Nb_3$ | 14 | 226 | 1.9 |
| C-5 | Ni—Zn Ferrite | 43 | 782 | 1.9 |

Note [1]:
Sample Nos. 60–77: Samples of the present invention.
Sample No. C-5: Comparative sample of Ni—Zn ferrite.
Measurement conditions:
Input DC power supply voltage E = 100 kV.
Capacitance C = 20 nF
Resistor 27 (primary winding side) $R_p$ = 0.05 Ω.
Resistor 29 (secondary winding side) $R_s$ = 50 Ω.
Bias magnetization $H_B$ = −8 A/m.
Primary and secondary windings: Both 1 turn.

It is clear from Table 11 that the magnetic core size is extremely smaller in the present invention than in the comparative example to achieve the same performance.

Particularly, since the iron-base fine crystalline soft magnetic alloy ribbons show larger relative pulse permeabilities $\mu_{rp}$ than the iron-base amorphous alloy ribbons, the magnetic cores constituted by the iron-base fine crystalline soft magnetic alloy ribbons can be more miniaturized than those of the amorphous counterparts.

In addition, even in the same composition, in the case of $B_r/B_{800}$ of 0.7 or more, $\Delta B$ can be increased even at as small a bias magnetization $H_B$ as −8 A/m, meaning that the miniaturization of the entire magnetic cores can be effectively achieved.

As described above in detail, according to the present invention, the magnetic core size of the magnetic device for suppressing surge current in the accelerator can be greatly reduced as compared with the magnetic core constituted by Ni—Zn ferrite, thereby achieving a remarkable miniaturization of the accelerator.

What is claimed is:

1. A magnetic device for suppressing surge current in an accelerator, which is inserted between a high-voltage DC power supply and a load for suppressing surge current generated when electric charge stored in a stray capacitance existing between said high-voltage DC power supply and said load is released at the time of short-circuiting of said load, said magnetic device comprising a magnetic core constituted by interlaminar-insulated thin ribbons of an amorphous magnetic alloy, wherein said magnetic core has a relative pulse permeability $\mu_{rp}$ of 1000 or more at a pulse width of 1 μs and an operating magnetic flux density of 0.2 T.

2. The magnetic device according to claim 1, wherein said magnetic core is constituted by iron-base amorphous magnetic alloy ribbons.

3. The magnetic device according to claim 2, wherein said iron-base amorphous magnetic alloy has the composition represented by the formula:

$(Fe_{1-a}M_a)_{100-y-z-\alpha-\beta}Si_yB_zM'_\alpha X_\beta,$ wherein M is Co and/or Ni, M' is at least one transition element, X is at least one element selected from the group consisting of C, Ge, P, Ga, Sb, In, Be and As, and a, y, z, α and β respectively satisfy $0 \leq a \leq 0.5$, $0 \leq y \leq 30$, $5 \leq z \leq 35$, $10 \leq y+z \leq 35$, $0 \leq \alpha \leq 10$ and $0 \leq \beta \leq 10$.

4. The magnetic device according to claim 1, wherein said magnetic core shows a squareness ratio of 0.7 or more in a DC magnetization curve.

5. A magnetic device for suppressing surge current in an accelerator, which is inserted between a high-voltage DC power supply and a load for suppressing surge current generated when electric charge stored in a stray capacitance existing between said high-voltage DC power supply and said load is released at the time of short-circuiting of said load, said magnetic device comprising a magnetic core constituted by interlaminar-insulated thin ribbons of an iron-base fine crystalline soft magnetic alloy having the composition represented by the general formula:

$(Fe_{1-a}M_a)_{100-x-y-z-\alpha}Cu_xSi_yB_zM'_\alpha$ wherein M is Co and/or Ni, M' is at least one element selected from the group consisting of Nb, W, Ta, Zr, Hf, Ti and Mo, and a, x, y, z and α respectively satisfy $0 \geq a \geq 0.5$, $0.1 \geq x \geq 3$, $0 \geq y \geq 30$, $0 \geq z \geq 25$, $5 \geq y+z \geq 30$ and $0.1 \geq \alpha \geq 30$, at least 50% of the alloy structure being fine crystal grains made of a bcc Fe solid solution having an average crystal grin size of 1000Å or less when determined from a maximum size of each crystal grain, wherein said magnetic core has a relative pulse permeability $\mu_{rp}$ of 1000 or more at a pulse width of 1 μs and an operating magnetic flux density of 0.2 T.

6. The magnetic device according to claim 5, wherein said magnetic core shows a squareness ratio of 0.7 or more in a DC magnetization curve.

7. A surge current-suppressing circuit for an accelerator having a high-voltage DC power supply and an ion source operatively connected thereto, the circuit comprising a magnetic device inserted between said high-voltage DC power supply and said ion source for suppressing surge current generated when electric charge stored in a stray capacitance existing between said high-voltage DC power supply and said ion source is released at the time of short-circuiting of said ion source, said magnetic device comprising a magnetic core constituted by interlaminar-insulated thin ribbons of an amorphous magnetic alloy, wherein said magnetic core has a relative pulse permeability $\mu_{rp}$ of 1000 or more at a pulse width of 1 μs and an operating magnetic flux density of 0.2 T.

8. The circuit according to claim 7, wherein said magnetic Core shows a squareness ratio of 0.7 or more in a DC magnetization curve.

9. A surge current-suppressing circuit for an accelerator having a high-voltage DC power supply, an ion source operatively connected thereto, the circuit comprising a magnetic device inserted between said high-voltage DC power supply and said ion source for suppressing surge current generated when electric charge stored in a stray capacitance existing between said high-voltage DC power supply and said ion source is released at the time of short-circuiting of said ion source said magnetic device comprising a magnetic core constituted by interlaminar-insulated thin ribbons of an iron-base fine crystalline soft magnetic alloy halving the composition represented by the general formula:

$$(Fe_{1-a}M_a)_{100-x-y-z-\alpha}Cu_xSi_yB_zM'_\alpha$$

wherein M is Co and/or Ni, M' is at least one element selected from the group consisting of Nb, W, Ta, Zr, Hf, Ti and Mo, and a, x, y, z and α respectively satisfy $0 \geq a \geq 0.5$, $0.1 \geq x \geq 3$, $0 \geq y \geq 30$, $0 \geq z \geq 25$, $5 \geq y+z \geq 30$ and $0.1 \geq \alpha \geq 30$, at least 50% of the alloy structure being fine crystal grains made of a bcc Fe solid solution having an average crystal grain size of 1000Å or less when determined from a maximum size of each crystal grain, wherein said magnetic core has a relative pulse permeability $\mu_{rp}$ of 1000 or more at a pulse width of 1 μs and an operating magnetic flux density of 0.2 T.

10. The circuit according to claim 9, wherein said magnetic core shows a squareness ratio of 0.7 or more in a DC magnetization curve.

* * * * *

UNITED STATES PATENT AND TRADEMARK OFFICE
CERTIFICATE OF CORRECTION

PATENT NO. : 5,443,664
DATED : August 22, 1995
INVENTOR(S) : Nakajima, et. al.

It is certified that error appears in the above-indentified patent and that said Letters Patent is hereby corrected as shown below:

Title page, Abstract, col. 2, line 17, "X" should read --x--.
Column 17, claim 8, line 15, "Core" should read --core--.
Column 18, claim 9, lines 12-13, "$\geqq$" all occurrences should read--  --.

Signed and Sealed this

Fourth Day of June, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,443,664
DATED : August 22, 1995
INVENTOR(S) : NAKAJIMA et al.

It is certified that error appears in the above-indentified patent and that said Letters Patent is hereby corrected as shown below:

Title page, Abstract, col. 2, line 13, "$(Fe_{1-a}M_a)_{100-x-y-z-\alpha}Cu_xSi_yB_zM'_\alpha$" should read --"$(Fe_{1-a}M_a)_{100-x-y-z-\alpha}Cu_xSi_yB_zM'_\alpha$--;

Claim 5, col. 16, line 51, "$(Fe_{1-a}M_a)_{100-x-y-z-\alpha}Cu_xSi_yB_zM'_\alpha$" should read --"$(Fe_{1-a}M_a)_{100-x-y-z-\alpha}Cu_xSi_yB_zM'_\alpha$--;

lines 56-57, "$\geq$" should read --$\leq$-- (all occurrences).

Signed and Sealed this

Twenty-fourth Day of September, 1996

Attest:

BRUCE LEHMAN

*Attesting Officer*  *Commissioner of Patents and Trademarks*